SELF-ACTUATING RECORD HOLDING APPARATUS

Original Filed Oct. 28, 1966 3 Sheets-Sheet 1

INVENTOR.
JULIAN GUTIERREZ
Reifard Gregory
ATTORNEYS

SELF-ACTUATING RECORD HOLDING APPARATUS

Original Filed Oct. 28, 1966 3 Sheets-Sheet 2

INVENTOR.
JULIAN GUTIERREZ
BY
Rifond Gregory
ATTORNEYS

SELF-ACTUATING RECORD HOLDING APPARATUS

Original Filed Oct. 28, 1966 3 Sheets-Sheet 3

JULIAN GUTIERREZ

Reifard Gregory
ATTORNEYS

United States Patent Office

Re. 27,462
Reissued Aug. 15, 1972

27,462
SELF-ACTUATING RECORD HOLDING APPARATUS

Julian Gutierrez, 6233 Brookview Ave. S., Minneapolis, Minn. 55424

Original No. 3,446,360, dated May 27, 1969, Ser. No. 590,252, Oct. 28, 1966. Application for reissue Sept. 4, 1970, Ser. No. 69,525
Int. Cl. A47b *81/06*
U.S. Cl. 211—40 2 Claims

Matter enclosed in heavy brackets [ ] appears in the original patent but forms no part of this reissue specification; matter printed in italics indicates the additions made by reissue.

ABSTRACT OF THE DISCLOSURE

A phonograph record rack consisting of a frame, a plurality of spaced parallel axially pivoted record holding members, each comprising a yoke portion to receive a record and having a depending leg portion of such length and arrangement as to engage an adjacent like leg portion for a sufficient interval to tilt the record holding member of said leg portion to a point beyond its center of gravity whereby said tilted record holding member in like manner automatically engages and tilts the record holding member adjacent thereto.

*BACKGROUND AND SUMMARY OF THE INVENTION*

The invention herein relates to improvement in a rack type of apparatus for holding and displaying relatively flat items of various kinds. In the specific embodiment of the invention here disclosed, particular reference is had to phonograph records, such as are generally contained in a paperboard jacket.

Generally stated, the invention herein comprises a frame member having a plurality of parallel cross members pivoted therein with each being arranged to hold a phonograph record upright and each having a [doubling] *depending* leg portion of such length and arrangement that when the first of said holding members has been tilted beyond its point of center of gravity that its leg portion will engage and tilt the adjacent holding member in like manner and thus each holding member automatically tilts the holding member adjacent thereto with the exception that if a record has been removed from a holding member that such holding member will be incapable of tilting the holding member adjacent thereto holding a record therein.

It is desirable to have such an apparatus as is here disclosed arranged and constructed to hold records in such a manner that in viewing said records, the manual action of tilting one record causes the adjacent and successively positioned records to automatically tilt in like manner. The structure described resulting in the automatic tilting of said records comprises the improvement in the apparatus herein.

It is an object of this invention therefore to provide a record holding apparatus particularly constructed and arranged for the automatic tilting of said records for a review or inspection thereof.

It is another object of the invention herein to provide simply constructed record holding members tiltable in such a manner that when one of said holding members has swung through a predetermined distance, it engages and causes the adjacent holding member to tilt and in like manner causes an automatic progression of this action.

It is also an object of this invention to provide a record holding apparatus so arranged and constructed that records held therein may be caused to tilt automatically for inspection to the point at which a record has been previously removed and at such point said tilting action comes to a stop.

These and other objects and advantages of the invention will be set forth in the following description made in connection with the accompanying drawings in which like reference characters refer to similar parts throughout the several views and in which.

*DESCRIPTION OF A PREFERRED EMBODIMENT*

Figure 1:
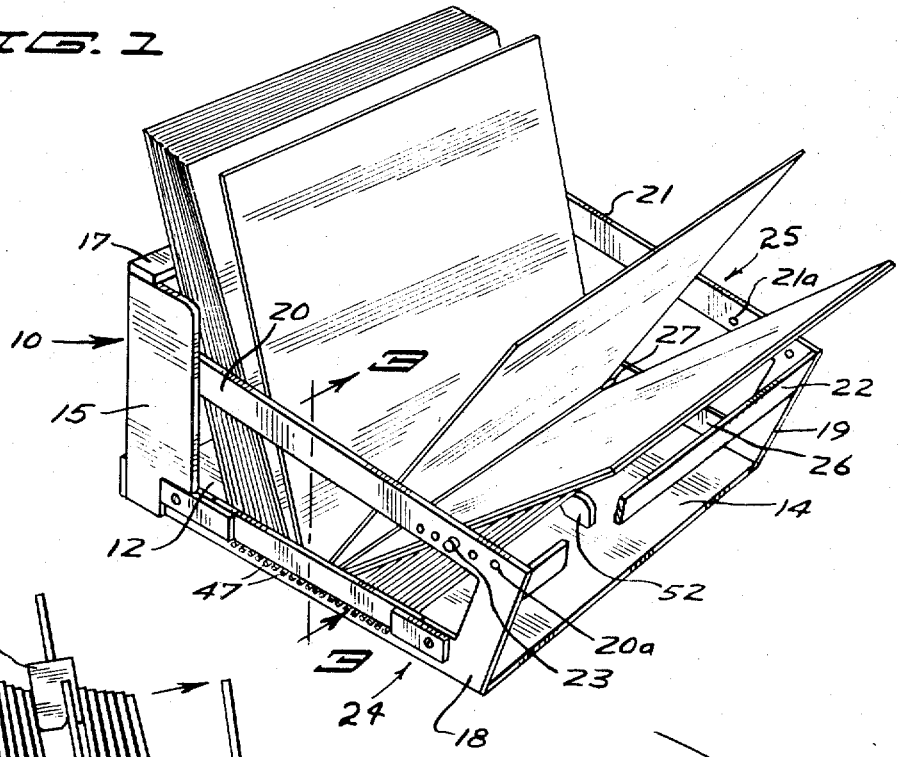
FIG. 1 is a view in perspective of the apparatus herein.
Figure 2:
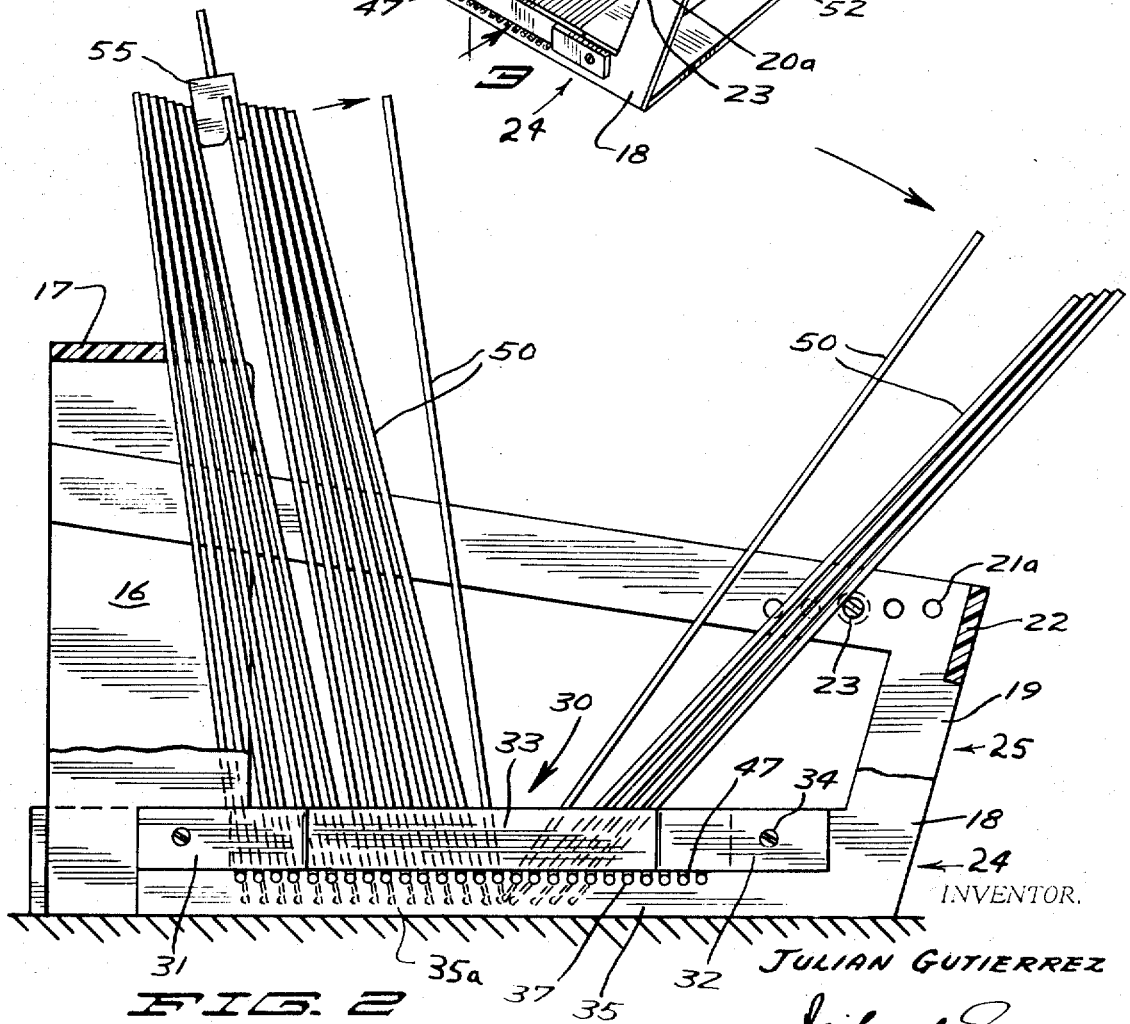
FIG. 2 is a view on an enlarged scale partially in side elevation and partially in longitudinal vertical section with portions thereof being shown in dotted line.
Figure 3:
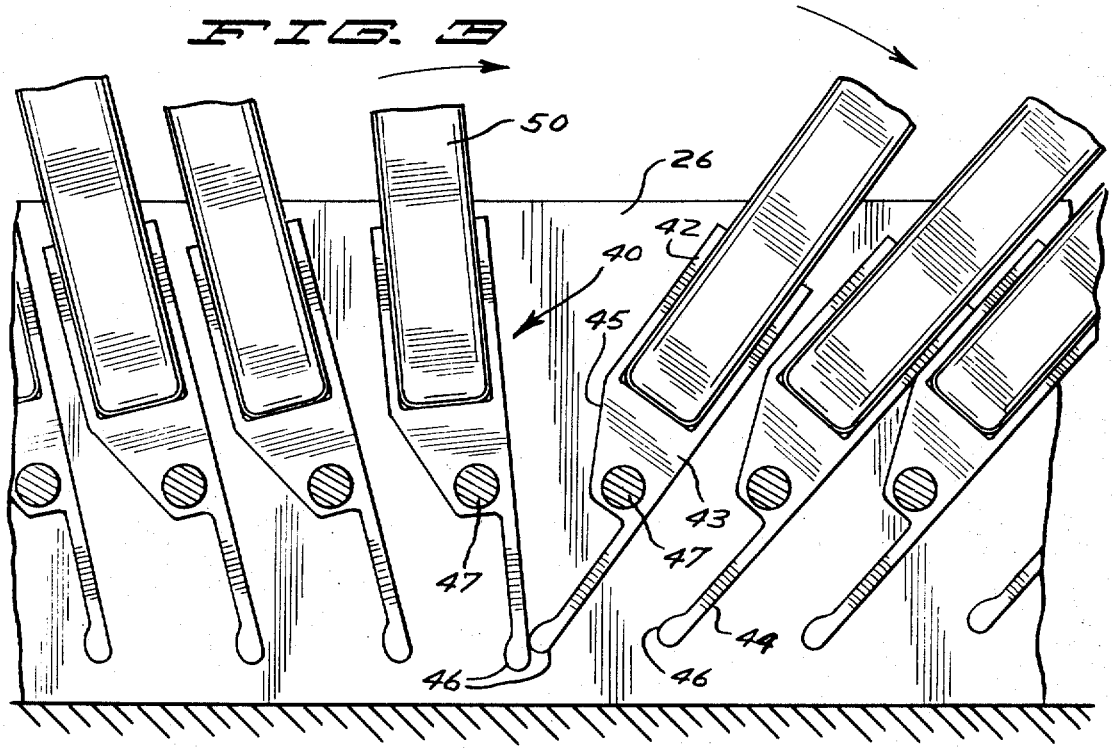
FIG. 3 is a fragmentary view in vertical section on an enlarged scale taken on line 3—3 of FIG. 1 as indicated.

Referring to the drawings, the record holding apparatus comprising the subject matter of the invention herein is indicated generally by the character 10. It will be understood that the apparatus shown may take various specific forms all within the scope of the invention herein. The specific embodiment shown is particularly adapted to receive and hold the flat members 50 indicated which are taken here to represent paperboard jackets containing phonograph records and are hereinafter referred to as records.

Said apparatus 10 has a bottom wall 14 formed of a rectangular plate member. Upstanding therefrom are rear side wall portions 15 and 16 having an overlying connecting strip member 17.

Integral frame members 24 and 25 form side walls comprising upstanding somewhat inclined forward side wall portions 18 and 19 of somewhat lesser height than said rear wall portions, and the upper portions of the same are connected by an upper cross strip member 22. Respectively connecting the upper portions of said front and rear side wall portions are strip portions 20 and 21.

Connecting the base portions of said side portions 16 and 19 is a strip or narrow wall portion 26. Connecting the base portions of the side portions 15 and 18 is a narrow wall or strip portion 35 having a major central portion 35a thereof reduced in height and having a multiplicity of transverse open topped slots or apertures 37 formed therein and spaced therealong. Apertures 27 corresponding to and respectively in transverse alignment with said slots 37 are formed in said wall portion 26.

A sectional plate member 30 comprises a central strip portion 33 overlying the upper edge of said slotted area of said wall portion 35, and end portions 31 and 32 secured by screws 34 respectively overlap the adjacent outer surface end portions of said wall portion 35 and the plate member 33.

The forward end portions of said side wall portions 20 and 21 respectively have pairs of aligned apertures 20a and 21a therein to receive elongated pegs 23 extending inwardly thereof to form stop members.

The structure 10 in the embodiment here described is preferably formed of a suitable rigid plastic material, the various separate portions of which may be secured together by suitable plastic bonding agents except where otherwise indicated.

Disposed between said side portions 26 and 35 and ivotally disposed in pairs of said aligned apertures 27 and 7 are record holding members 40. A preferred em- odiment is here shown with the understanding that said olding members may take various specific forms. Only ne as representative of all of said holding members hown will be described in detail.

Said member 40 comprises integrally a substantially J-shaped yoke portion 42 having a supporting body por- ion 43 tapering in thickness having an inclined [front] *ear* wall 45 and a depending leg portion 44 having a omewhat rearwardly bulging tip portion 46. Said mem- er 40 and the portions described thereof extend the full vidth between said side members 26 and 35 and said pertures 27 and 37 will be spaced along their respec- ive side wall portions to allow sufficient clearance for reedom of pivotal movement.

Projecting from [either end] *both ends* of body por- ion 43 are aligned pins 47 to be received respectively vithin aligned pairs of said apertures 27 and 37. Said ins preferably will be located on an axis forwardly of nd below the center of gravity or axis of balance of said olding members whereby a major portion of the weight f said holder 40 and of the record 50 therein will ac- elerate through the downward portion of the tilting action hereof and will apply sufficient leverage against the ad- acent holder and record by leg contact theerwith to tilt he same upwardly beyond its dead center point or to the oint at which it will continue its travel under its own veight.

Upstanding from said bottom wall 14 centrally for- vardly and rearwardly respectively thereof are stop mem- ers 52 for said holding members 40.

A position marking member or marker 55 is pro- ided comprising a slotted block having an upstanding andle adapted to be disposed onto an end portion of a ecord 50.

OPERATION

The holding members 40 will be loaded with the records 0. The records are simply set into the slotted yokes 42. f less than all of the holders are used, they will be oaded from the rearmost one forwardly and the stop ins 23 will be suitably positioned to control the for- vard tilt of the records.

To commence the records in their self-tilting action, the irst record will be tilted manually which in turn will auto- natically tilt the next record, and thus in succession the ecords will tilt one another.

It is desirable to have a sufficient interval of time in he forward upward tilting movement of each record to nable the operator to identify the record, as by reading he label. The holders are spaced apart sufficiently to rovide for the record to swing through a sufficient arc to llow for adequate scanning or reading time. Thus aligned airs of the apertures 27 and 37 will be spaced sufficiently part from one another to provide an adequate extent of rcuate movement.

The lengths of the legs 44 will be in relation with the pacing of said aligned pairs of apertures, as shown in IG. 3. It is on the downward tilt of a record that the eg of its holder will engage the leg of the adjacent holder. There is sufficient leverage and impetus for one holder and ts record to engage and move the adjacent holder and ecord sufficiently to commence self-tilting action. This s accomplished as above described by having the pins 7 aligned on an axis eccentric to the axis at which the older and its record would be in balance. On the down- vard tilt, the impetus of unbalanced weight readily tilts he adjacent holder and record. This action is more posi- ive for the tilting of the holders themselves in an un- oaded condition or with the items held being of negligible veight than would be the case with the pins being located n an axis of balance of the holders.

It will be understood that the tilting action continues so ong as each holder and its record provides sufficient weight to move the succeeding holder and its record upon en- gagement therewith.

When a record has been removed from a holder, that particular holder upon being tilted will not have sufficient weight to exert sufficient leverage to [upset] *overcome* the inertia of the next succeeding holder and record. Hence at such a point the automatic tilting action will stop. Thus the holder from which a record has been re- moved is readily located.

It will be further understood that the holders in un- loaded condition have the same progressive tilting action as in loaded condition.

The term record used herein with respect to a phono- graph record is to be understood as being representive of any items capable of being held in an embodiment of a holder within the inventive scope herein.

Thus from the above description, so long as the holders loaded or unloaded, represent substantially equal amounts of weight, the holders, save for the first one, will cause one another to tilt. Tilting action will stop with the holder having a lesser amount of weight.

MODIFICATION

Figure 4:
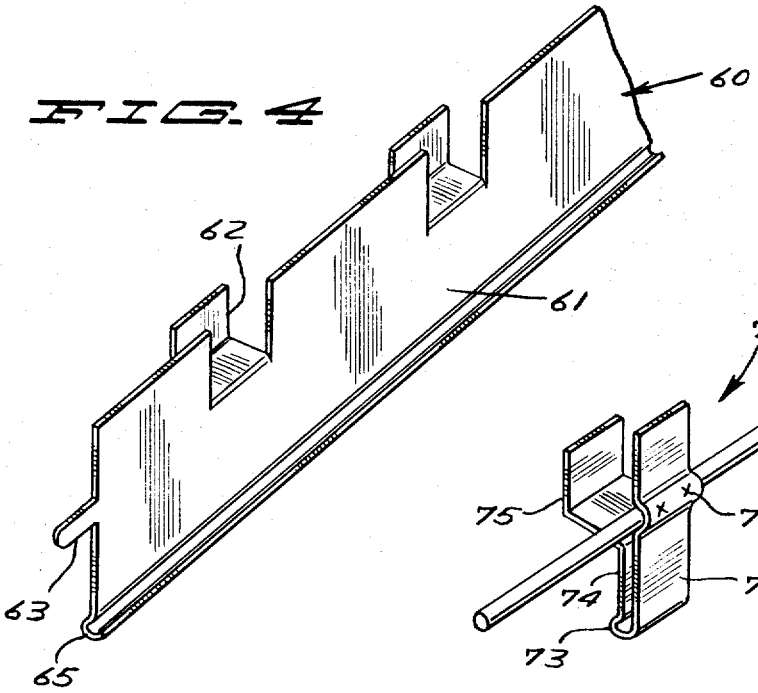
FIG. 4 is a broken view in perspective of a modification of a detail on an enlarged scale.

A broken view of a modified record holder 60 is shown in FIG. 4 comprising a flat elongated plate mem- ber 61 having a lower rearwardly beaded edge portion 65, an extended pin or shaft portion 63 at [either end] *both ends* thereof on an axis providing for an unbalanced distri- bution of weight and rearwardly projecting angled brackets 62 struck from said body portion forming the record holding means. With reference to the axis of said pins 63, the greater amount of weight will be upwardly and [forwardly] *rearwardly* of said axis.

Figure 5:
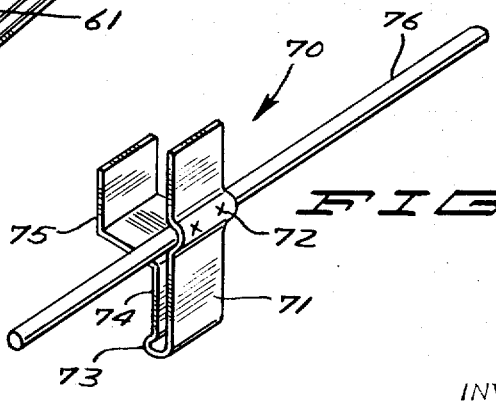
FIG. 5 is a view similar to FIG. 4 showing a like detail in another modified form.
Figure 6:
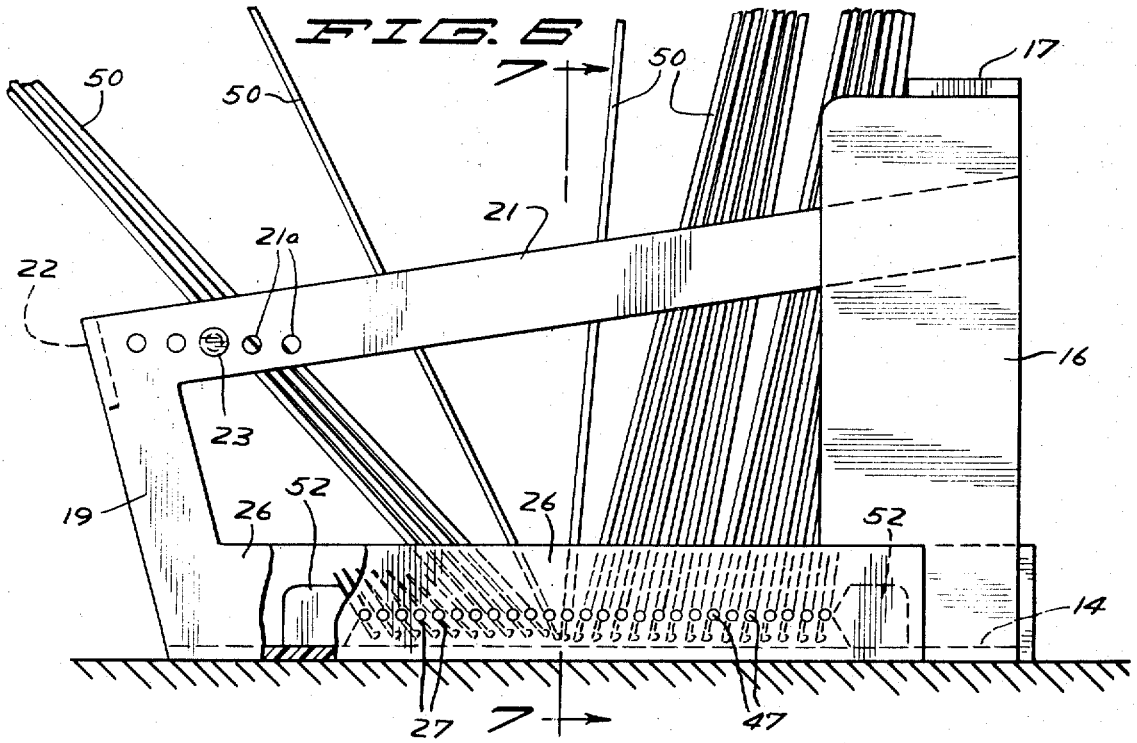
FIG. 6 is a view similar to FIG. 2 showing the opposite side in elevation with some portions in dotted line and a portion broken away.
Figure 7:
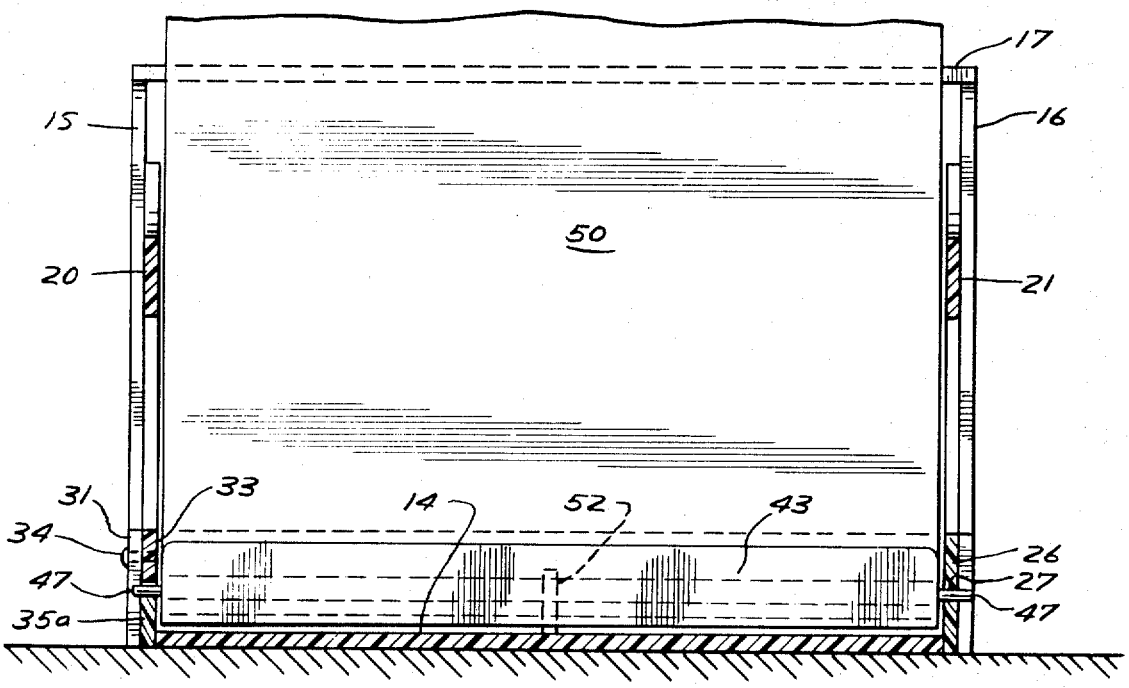
FIG. 7 is a view in vertical cross section with some portions being shown in dotted line and a portion being broken away, taken on line 7—7 of FIG. 6 as indicated.

Referring to FIG. 5, a record holding member 70 representing another modification is shown comprising a clip of relatively narrow width having a reversely bent body portion having closely adjacent sides 71 and 74 having a rearwardly projecting bead-like juncture 73. The wall 71 extends upwardly with a transverse curved groove therein to receive a rod 76 which will be secured therein as by spot welding. Said rod will extend the full width of said apparatus 10. Said wall 74 has a rearwardly projecting upwardly angled portion 75 forming a yoke or slot with said side 71 to receive a record.

Said holding members 60 and 70 are positioned within the apparatus 10 in the manner described in connection with the holding member 40 to operate in like manner.

Thus it is seen that I have provided a simply con- structed self-actuating record holding apparatus which has been very successful in operation.

It will of course be understood that various changes may be made in the form, details, arrangement and pro- portions of the parts, without departing from the scope of *the* applicant's invention which, generally stated con- sists in an apparatus capable of carrying out the objects above set forth, in the parts and combinations of parts disclosed and defined in the appended [claim] *claims*.

What is claimed is:

1. A self-actuating record holding apparatus having in combination:

a pair of frame members, means supporting said frame members in parallel spaced relation, said frame members having aligned pairs of holding means spaced longitudinally thereof, a holding member as for a record comprising a U-shaped member of substantially shorter height than the record held therein having an underlying body portion [of reduced thickness], a leg portion depending from said body portion, means at [either side end] *both ends* of said body por- tion pivotally engaging an aligned pair of said hold- ing means, said means being arranged to provide a pivotal axis through said body portion [eccentric to said holding member], one of said holding members being disposed between each of said pairs of holding means, said holding means being spaced to have the body portions of adjacent *of* said holding members free of contact with one another in tilting from an inclined rest position in one direction to an inclined rest position in the opposed direction, said leg portions of said holding memers each being of such a length as to have its respective body portion tilt through an arc beyond its *dead* center *point* [of specific gravity] prior to its engagement with the leg portion of the adjacent holding member to tilt said adjacent holding member and [disengaging] *disengage* from said adjacent leg portion as said adjacent body portion tilts beyond its *dead center* point [of specific gravity] whereby upon the first of said holding members being tilted manually, the remainder of said holding members, *one at a time,* automatically [successively] tilt [one another] each other one after the other.

*2. A self-actuating record holding apparatus having in combination:*

*a pair of frame members,*

*means supporting said frame members in spaced relation,*

*said frame members having aligned pairs of opposed holding means spaced longitudinally thereof,*

*a holding member as for a phonograph record comprising a U-shaped member of substantially shorter height than the record held therein and having an underlying body portion,*

*a leg portion depending from said body portion,*

*means at both ends of said body portion pivotally engaging an aligned pair of said holding means, said means being arranged to provide a pivotal axis through said body portion,*

*said holding members respectively being disposed between said pairs of said holding means,*

*said holding means being spaced to have the body portions of adjacent of said holding members free from contact with one another in tilting from an inclined rest position in one direction to an inclined rest position in the opposed direction,*

*said leg portion of each of said holding members being of such length as to have its respective body portion tilt through an arc beyond the dead center point thereof prior to its engagement with the leg portion of the adjacent holding member to tilt said adjacent holding member and disengage from said adjacent leg portion as said adjacent body portion tilts beyond its dead center point whereby upon the first of said holding members having a record disposed therein being tilted manually, the remainder of said holding members having records respectively disposed therein, one at a time, automatically tilt each other one after the other.*

References Cited

The following references, cited by the Examiner, are of record in the patented file of this patent or the original patent.

UNITED STATES PATENTS

| | | | |
|---|---|---|---|
| 1,218,484 | 3/1917 | Silvius | 211—169.1 |
| 1,474,642 | 11/1923 | Proudfit | 40—102 |
| 1,692,231 | 11/1928 | Thompson | 211—11 UX |
| 815,785 | 3/1906 | Bennett | 129—16 X |
| 1,440,491 | 1/1923 | Proudfit | 211—11 |
| 1,469,798 | 10/1923 | Martin. | |
| 2,226,519 | 12/1940 | Larsen. | |
| 2,843,131 | 7/1958 | Wolters | 129—160 |

FOREIGN PATENTS

| | | | |
|---|---|---|---|
| 91,406 | 7/1958 | Denmark | 129—16 |
| 649,720 | 9/1937 | Germany | 211—11 |
| 213,845 | 3/1958 | Australia. | |
| 725,993 | 2/1932 | France. | |
| 81,789 | 6/1956 | Netherlands. | |
| 114,118 | 6/1945 | Sweden. | |

ROY D. FRAZIER, Primary Examiner

A. FRANKEL, Assistant Examiner

U.S. Cl. X.R.

211—164, 170, 169.1; 312—13